(12) United States Patent
Nenov

(10) Patent No.: US 10,432,670 B2
(45) Date of Patent: *Oct. 1, 2019

(54) SYSTEMS AND METHODS FOR NETWORK SECURITY MEMORY REDUCTION VIA DISTRIBUTED RULESETS

(71) Applicant: Fortress Cyber Security, LLC, Orlando, FL (US)

(72) Inventor: Dejan Nenov, Boise, ID (US)

(73) Assignee: Fortress Cyber Security, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/702,613

(22) Filed: Sep. 12, 2017

(65) Prior Publication Data

US 2018/0109562 A1   Apr. 19, 2018

Related U.S. Application Data

(63) Continuation of application No. 15/292,669, filed on Oct. 13, 2016, now Pat. No. 9,819,699.

(51) Int. Cl.
*H04L 29/06* (2006.01)
*H04L 29/08* (2006.01)

(52) U.S. Cl.
CPC ......... *H04L 63/20* (2013.01); *H04L 63/0263* (2013.01); *H04L 67/32* (2013.01)

(58) Field of Classification Search
CPC ................. H04L 63/20; H04L 67/32
USPC ....................................... 726/1, 3
See application file for complete search history.

(56) References Cited

U.S. PATENT DOCUMENTS

| 6,779,120 B1* | 8/2004 | Valente ............... H04L 41/0609 717/117 |
| 7,219,237 B1 | 5/2007 | Trimberger |
| 7,832,008 B1* | 11/2010 | Kraemer ............... G06F 21/554 709/223 |
| 7,996,896 B2* | 8/2011 | Durie ..................... G06F 21/55 709/224 |

(Continued)

OTHER PUBLICATIONS

Kumar, A.P. et al. "Rule Set Optimization for Pack Pre-processing using Hash based Algorithm," IEEE Jan. 2016, Microelectronics, Computing and Communications (MicroCom), 2016 International Conference.

(Continued)

*Primary Examiner* — Jahangir Kabir
(74) *Attorney, Agent, or Firm* — Foley & Lardner LLP

(57) ABSTRACT

The present disclosure describes systems and methods for reducing rule set sizes via statistical redistribution throughout a plurality of network security appliances. A rule set may be generated for each security appliance that includes (i) a first set of rules based on known attacks, identified as rules for mandatory inclusion in the rule set; and (ii) a subset of the second set of rules, identified as rules for potential inclusion in the rule set, selected randomly according to a distribution percentage, score, or weight for each potentially included rule. Higher scored rules, which may be more likely vectors for potential attack, may be distributed to a greater number of appliances; while lower scored rules that may be less likely or represent more speculative attacks may be distributed to fewer appliances.

16 Claims, 6 Drawing Sheets

(56) References Cited

U.S. PATENT DOCUMENTS

| | | | |
|---|---|---|---|
| 8,627,402 B2 * | 1/2014 | Cohen | H04L 67/34 |
| | | | 726/1 |
| 9,400,669 B2 | 7/2016 | Anantharam et al. | |
| 2002/0152209 A1 | 10/2002 | Merugu et al. | |
| 2008/0201772 A1 | 8/2008 | Mondaeev et al. | |
| 2012/0079266 A1 | 3/2012 | Ogata et al. | |
| 2013/0263214 A1 | 10/2013 | Yamagata et al. | |
| 2015/0244842 A1 | 8/2015 | Laufer et al. | |
| 2016/0191466 A1 | 6/2016 | Pernicha | |
| 2017/0093914 A1 | 3/2017 | Venkataramanan et al. | |

OTHER PUBLICATIONS

Zheng, K. et al. "Parallel Packet Classification via Policy Table Pre-Partitioning," IEEE 2005, Global Telecommunications Conference, 2005, GLOBECOM '05.

Non-Final Office Action in U.S. Appl. No. 15/292,669, dated Jan. 5, 2017.

Notice of Allowance in U.S. Appl. No. 15/292,669, dated Apr. 27, 2017.

US Notice of Allowance on U.S. Appl. No. 15/292,669 dated Apr. 27, 2017.

US Office Action on U.S. Appl. No. 15/292,669 dated Jan. 5, 2017.

\* cited by examiner

| Rules Database 110 | | | | |
|---|---|---|---|---|
| Rule Identifier 120 | Rule 122 | Mandatory Flag 124 | Distribution Percentage 126 | Device Identifiers 128 |
| 1 | Block DNS requests to 1.2.3.4 | Yes | 100% | 1, 2, 3, 4, 5... |
| 2 | Block DNS requests with size > 500B | No | 80% | 1, 3, 4, 5, 6, 8, 9... |
| 3 | Block transmissions to WAN from clients at 10.0.2.* | No | 10% | 2, 12, 22... |
| ○○○ | | | | |
| n | [action(s)]+ [condition(s)]+ [parameters(s)] | [Flag] | [Percentage] | [IDs] |

*FIG. 1C*

SYSTEMS AND METHODS FOR NETWORK SECURITY MEMORY REDUCTION VIA DISTRIBUTED RULESETS

RELATED APPLICATIONS

This application claims the benefit of and priority as a continuation to U.S. patent application Ser. No. 15/292,669, entitled "Systems and Methods for Network Security Memory Reduction via Distributed Rulesets," filed Oct. 13, 2016, the entirety of which is hereby incorporated by reference.

BACKGROUND

Network security frequently requires packet inspection and filtering, including applying blocking, forwarding, or redirection rules to incoming packets. These rules may be quite complex, based on a combination of information from one or more layers of the packet. As a result, a rules database on a security appliance may become quite large, with significant storage requirements. Additionally, for large rule sets, it may take significant time to compare the packet information to each rule within the database, resulting in delays and inefficiencies within the system.

SUMMARY

The present disclosure describes systems and methods for reducing rule set sizes via statistical redistribution throughout a plurality of network security appliances. Administrators or security researchers may generate rules based on identifications of known attack vectors, such as by directly observing attacks or attack attempts. Additionally, administrators or security researchers may generate rules based on identifications of potential attack vectors, such as by identifying a vulnerability that has not yet been exploited in the wild, or by observing suspicious traffic that has not yet been associated with an attack. Accordingly, rules may be divided into a first set of rules to prevent known attack attempts, and a second set of rules to prevent potential attack attempts. This latter set of rules may be very large, and may include rules to protect against attacks that have not been and may not ever be implemented. Accordingly, in many instances, the latter set of rules may be unnecessary for inclusion on every security appliance.

Instead, a rule set may be generated for each security appliance that includes (i) the first set of rules based on known attacks, identified as rules for mandatory inclusion in the rule set; and (ii) a subset of the second set of rules, identified as rules for potential inclusion in the rule set, selected randomly according to a distribution percentage, score, or weight for each potentially included rule. Higher scored rules, which may be more likely vectors for potential attack, may be distributed to a greater number of appliances; while lower scored rules that may be less likely or represent more speculative attacks may be distributed to fewer appliances.

Accordingly, the rule set for any security appliance may be limited in size compared to the entire rules database, while still providing protection against most attacks. This may allow reduced memory utilization on each security appliance, and reduced bandwidth consumption during distribution of the rules from a management server. Furthermore, by limiting the size of an active rule set on an appliance, the appliance may have reduced CPU usage and delay processing packets against the rule set in comparison to a complete rule set including both mandatory and potential rules. This may also improve battery life on portable appliances. Additionally, appliances deployed with rules for potential inclusion may provide early warnings of new attacks, such that the corresponding rule may quickly be added to the first, mandatory inclusion set for each security appliances.

BRIEF DESCRIPTION OF THE FIGURES

FIG. 1C is an illustration of an embodiment of a rules database for distributed rule sets for network security appliances;

In the drawings, like reference numbers generally indicate identical, functionally similar, and/or structurally similar elements.

DETAILED DESCRIPTION

The following description in conjunction with the above-referenced drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Network security frequently requires packet inspection and filtering, including applying blocking, forwarding, or redirection rules to incoming packets. For example, an administrator may wish to block packets having particular source internet protocol (IP) addresses or destination addresses, or packets associated with particular protocols, applications or ports; may wish to forward other packets to predetermined destinations based on these parameters regardless of a destination included in the packet; or may wish to modify packets based on these parameters.

Figure 1A:
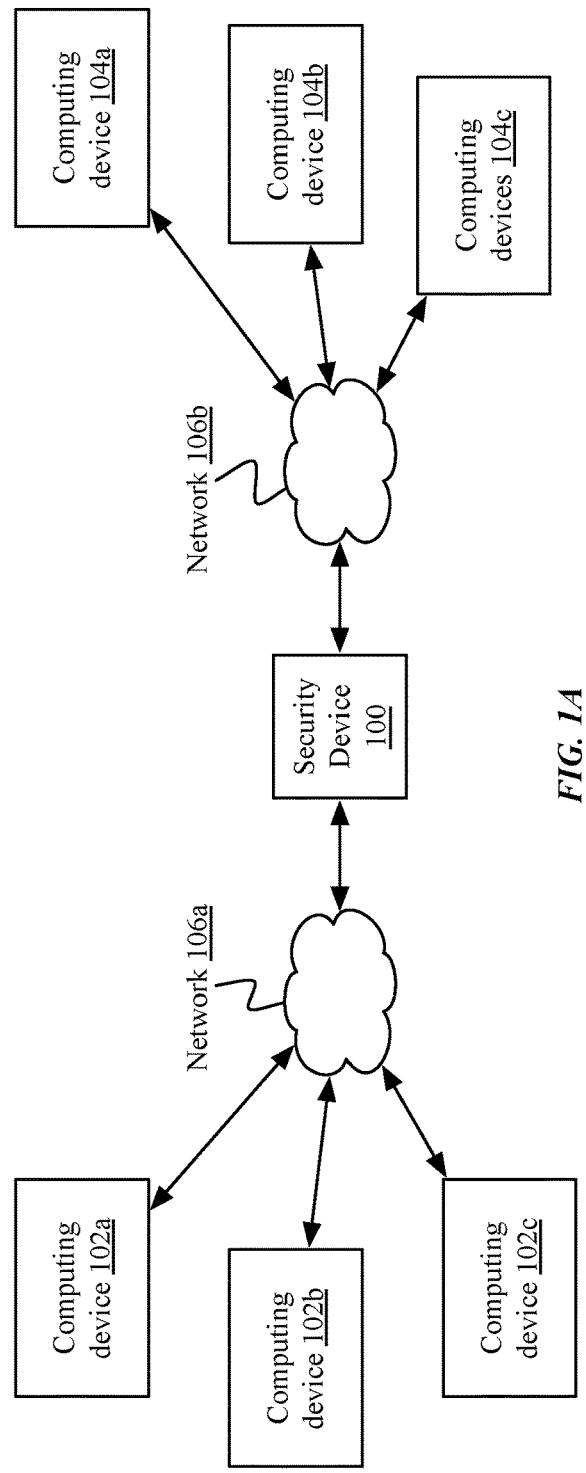
FIG. 1A is a block diagram of an embodiment of a computing environment for providing packet processing and network security.

For example, referring first to FIG. 1A, illustrated is a computing environment comprising a security device 100 deployed as an intermediary between a first one or more computing devices 102a-102c (referred to generally as client devices, clients, server devices, servers, host devices, hosts, or computing devices 102), and a second one or more computing devices 104a-104c (referred to generally as client devices, clients, server devices, servers, host devices, hosts, or computing devices 104), via a plurality of network segments 106a-106b (referred to generally as network segments or networks 106). Security device 100 may comprise a gateway, firewall, switch, hub, access point, modem, or any other such device. Although shown intermediary to networks 106a-106b, in some implementations, security device 100 may be deployed as a sidechain device. Networks 106 may comprise any type and form of network, including a local area network (LAN), wide area network (WAN) such as the Internet, a wireless network, a cellular network, a satellite network, a cable network, or any combination of these or other networks. Additional devices not illustrated may be deployed on networks 106, including switches, gateways, routers, firewalls, or other such devices. Computing devices 102, 104 may comprise any type and form of computing device, including desktop computers, laptop computers, tablet computers, smart phones, smart televisions, game consoles, wearable computers, networked devices or appliances such as Internet of Things (IoT) devices, server computers, workstations, or any other type and form of networked computing device, and may be variously referred to as servers, clients, hosts, remote devices, local devices, or by any other such name.

Security device 100 may receive packets from computing devices 102 and directed to other computing devices 104 (or vice versa), and may, depending on security and filtering rules, forward or retransmit the packet; block or discard the packet; or modify and retransmit the packet (e.g. with network address translation (NAT), payload stripping or encryption to prevent information exfiltration, etc.).

Packet processing or security rules may be quite complex, based on a combination of information from one or more layers of the packet, including internet or network layer addresses, transport layer addresses, session or application layer protocols, payload information, other header information such as quality of service (QoS) requirements or priority, or any other type and form of information. Administrators or security researchers may generate the rules based on identifications of known attack vectors, such as by directly observing attacks or attack attempts. For example, an administrator may observe a denial of service attack being transmitted from a subnet, and generate a rule to filter all or most of the packets from the subnet. Such attacks may be considered known or active threats, and the corresponding rules may be considered mandatory rules, or rules required to protect a network from known threats.

Additionally, administrators or security researchers may generate rules based on identifications of potential attack vectors, such as by identifying a vulnerability that has not yet been exploited in the wild, or by observing suspicious traffic that has not yet been associated with an attack. For example, an administrator may determine that a particular device is vulnerable to SSH attacks on non-standard ports, and may set up a rule to block SSH requests on ports other than 22 from being forwarded to the device, despite perhaps not having seen an attempted attack on the device in practice. In another example, an administrator may suspect that attack attempts may come from a particular country, and may decide to block all requests originating from that country. Such attacks may be considered potential or inactive threats, and the corresponding rules may be considered potential rules or rules that may be included to enhance security, without necessarily being required to protect against known threats. In many implementations, potential or inactive threats may have an estimated likelihood of becoming an active threat. For example, given a newly discovered vulnerability in a popular smartphone, it may be likely that malicious actors will attempt attacks as soon as the vulnerability is publicized or otherwise discovered. Such a threat may be presently inactive, but be considered to have a high likelihood of becoming active. Conversely, a suspicion that all packets from a particular country are attack attempts may be unlikely to be true, and may have a correspondingly low likelihood of becoming an active threat.

Accordingly, rules may be divided into a first set of rules to prevent known attack attempts, and a second set of rules to prevent potential attack attempts. This latter set of rules may be very large, and may include rules to protect against attacks that have not been and may not ever be implemented.

As rules databases get large, particularly for whitelist or blacklist-based blocking, it may take significant time to compare the packet information to each rule within the database, resulting in delays and inefficiencies within the system.

For example, in some implementations, packet processing rules may be stored in a relational database and accessed via structured query language (SQL) requests, or other similar processing or query languages. For example, in one such implementation, a system may include a database with a rule (e.g. a blocking rule to discard or block further transmission of an incoming packet) associated with a range of source IP addresses (e.g. from a starting IP address ip_from to an ending IP address ip_to). Upon receipt of a packet, the system may determine if the source IP address of the packet (e.g. 1.2.3.4) is within the indicated range, such as via a query of the database:

SELECT * from ipranges WHERE INET_ATON ('1.2.3.4') BETWEEN ip_from and ip_to; The SQL database may use a binary search tree, or B-tree index, to search through each of the ip_to and ip_from columns. However, as B-tree searches take $O(\log n)$ time on average (in Big O notation), this can take a significant amount of time. For example, given a potential search space in IPv4 of 4,294,967,296 potential addresses (from 0.0.0.0 to 255.255.255.255), a test system may take as much as 1.5 seconds to determine if the address is within a designated range. With IPv6 and a search space of $2^{128}$ addresses, identifying if an address is within a given range may take even longer. Furthermore, as additional filter parameters are added for comparisons, the queries may grow exponentially more complex. For example, determining whether a packet matches a rule specifying a range of source addresses, a second range of destination addresses, a third range of protocol types, a fourth range of payload sizes, and a fifth range of priorities may cause significant latency in processing and forwarding the packet.

Figure 1B:
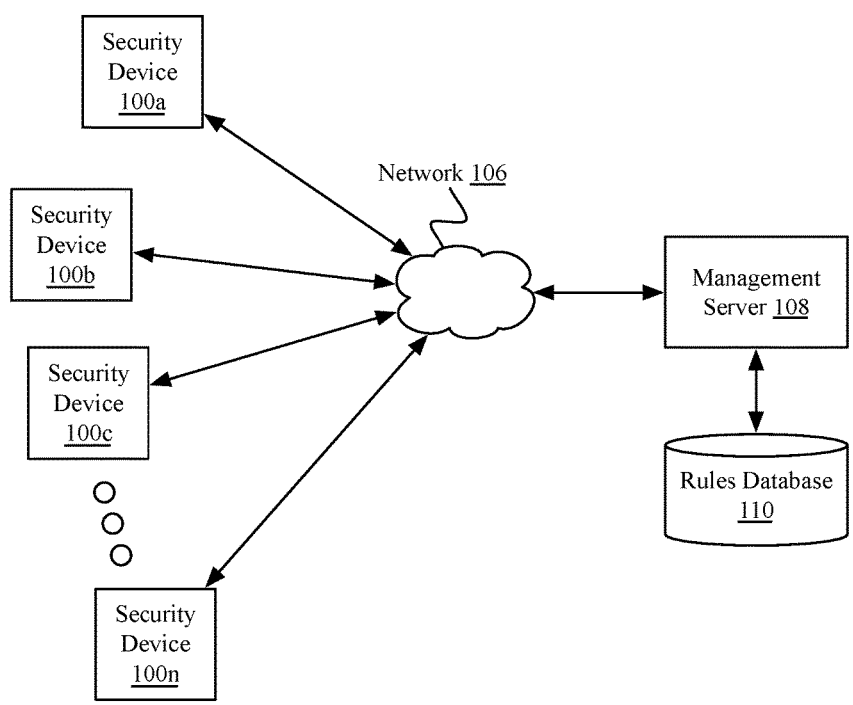
FIG. 1B is a block diagram of another embodiment of a computing environment for providing distributed rule sets to network appliances.

Instead, rules may be distributed to network security appliances according to a statistical model, in which the percentage of appliances receiving a particular rule is proportional to the likelihood of the corresponding attack (e.g. with rules corresponding to known or active attacks being distributed to 100% of appliances; and rules corresponding to inactive attacks being distributed to a lesser percentage of appliances). For example, and referring briefly to FIG. 1B, illustrated is a block diagram of an embodiment of a computing environment for providing distributed rule sets to network appliances. A management server 108 may comprise or maintain a rules database 110, comprising filtering, forwarding, modifying, or processing rules for various conditions and parameters. The management server may distribute the rules to a plurality of security devices 100a-100n via one or more network(s) 106. Each security device 100 may apply the rules to communications between one or more clients 102, 104 as discussed above. Rules corresponding to likely threats or active threats may be distributed to all or most of the security devices, while rules corresponding to unlikely or inactive threats may be distributed randomly to a smaller subset of the devices, with different rules distributed differently. Accordingly, the majority of appliances will be protected against all likely threats, and all of the rules will be active on at least some appliances, without requiring storing the entire rule database within memory of any security device. These devices may also serve as test machines for the rules; upon detecting an attack attempt corresponding to a non-mandatory rule, the device may notify the management server 108, which may increase the likelihood associated with the rule to 100%, ensuring that it is distributed to all appliances from that point on. Conversely, if no machine with an inactive attack rule detects a corresponding attack within a predetermined time, the likelihood may be reduced, freeing up memory for other, more important rules.

Thus, a rule set may be generated for each security device or appliance that includes (i) a first set of rules based on known attacks, identified as rules for mandatory inclusion in the rule set; and (ii) a subset of a second set of rules, identified as rules for potential inclusion in the rule set, selected randomly according to a distribution percentage, score, or weight for each potentially included rule. Higher scored rules, which may be more likely vectors for potential attack, may be distributed to a greater number of appliances; while lower scored rules that may be less likely or represent more speculative attacks may be distributed to fewer appliances.

Accordingly, the rule set for any security appliance may be limited in size compared to the entire rules database, while still providing protection against most attacks. This may allow reduced memory utilization on each security appliance, and reduced bandwidth consumption during distribution of the rules from a management server. Furthermore, by limiting the size of an active rule set on an appliance, the appliance may have reduced CPU usage and delay processing packets against the rule set in comparison to a complete rule set including both mandatory and potential rules. This may also improve battery life on portable appliances. Additionally, appliances deployed with rules for potential inclusion may provide early warnings of new attacks, such that the corresponding rule may quickly be added to the first, mandatory inclusion set for each security appliances.

FIG. 1C is an illustration of an embodiment of a rules database for distributed rule sets for network security appliances. Rules database 110 may be any type and form of database, including a flat file, array, relational database, or any other type of data format. In some implementations, rules database 110 may be a SQL database. As shown in FIG. 1B, in some implementations, rules database 110 may be stored on a storage device separate from a management server 108, such as a storage array, network attached storage device, database server, storage server, or any other type and form of storage device or as part of a computing device. In other implementations, rules database 110 may be stored in storage of management device 108, such as on a hard drive or drives, tape drive, flash drive, etc.

In some implementations, each rule within rules database 110 may be indexed or identified by a rule identifier 120, such as a string, hash value, random number, database or array index. This may allow for quick retrieval and modification of rules, as well as compact identification of rule sets provided to a security device. For example, a set of rule identifiers 120 may be associated with a device identifier for a security device, indicating the rule set distributed to said security device. In another example, upon detection of an attempted attack that matches a rule, a security device may store a rule identifier 120 to a log and/or transmit an identification of the rule identifier 120 to the management server 108 to indicate that an attempted attack has been detected and potentially stopped.

Each rule 122 may comprise one or more actions, one or more conditions, and one or more parameters. In many implementations, a rule may comprise a block or forward rule, indicating, respectively, whether to discard a matching packet or forward the packet to another device. The forwarding rule may indicate to forward the packet to a destination identified in the packet (e.g. in a destination IP address and destination port address respectively in a network and transport layer header of the packet), or may indicate to forward the packet to another device (e.g. a virtual machine for quarantine and/or testing; a processing machine for decryption or decompression; an alternate server for load balancing purposes, etc.). Rules may also include modification actions, such as removing a payload of a packet, replacing a payload with predetermined data or a null data set, modifying a header of the packet, etc. For example, in one implementation, a rule may indicate to modify a DNS query to remove additional data beyond a requested URL to prevent information exfiltration. Conditions may include any type and form of condition, and apply to any portion of a packet including headers or payloads at any layer of the OSI model. Multiple conditions may be applied simultaneously, with any appropriate Boolean operator (e.g. AND, OR, XOR, NOT, etc.). Rules may also include one or more parameters for conditions and/or actions, such as data to match, data to modify, data to replace with other data, etc.

In some implementations, a rule may be associated with a mandatory flag 124, indicating that the rule is a mandatory rule that must be included in every rule set distributed to security appliances. For example, in one implementation, an address of the management server may be included in a whitelist for each security appliance, so that the appliances may receive updated configurations and rule sets. The flag may be in any format, such as a predefined bit in a rule identifier 120, explicit flag, logical yes or no, or any other format. In other implementations, flags 124 may not be used.

Rules may be associated with distribution percentages, scores, or weights 126, which may be in any type and form and extend through any range. In some implementations, distribution percentages may be from 0 to 100% as shown, while in other implementations, scores may be from 0 to 1, 0 to 10, 1 to 100, −10 to 10, or any other such range. As discussed above, in some implementations, mandatory flags 124 may not be used; instead, a distribution percentage or score may be set to a maximum (e.g. 100%). In still other implementations, scores 126 may be unbounded, but may represent a priority for inclusion of rules. For example, higher priority numbers may be selected first for inclusion in a rule set until a threshold storage level is reached. In a further implementation, rules may be ordered by identifiers 120 in order of priority.

In some implementations, device identifiers of appliances receiving a rule may be added to a set of device identifiers 128 in database 110. This may allow for easy extraction and regeneration of a rule set for any particular appliance, for example, upon a factory or hard reset that clears an existing ruleset from memory. Storing device identifiers 128 with corresponding rules may also be useful for log analysis or research after an attack or attempt.

Figure 2A:
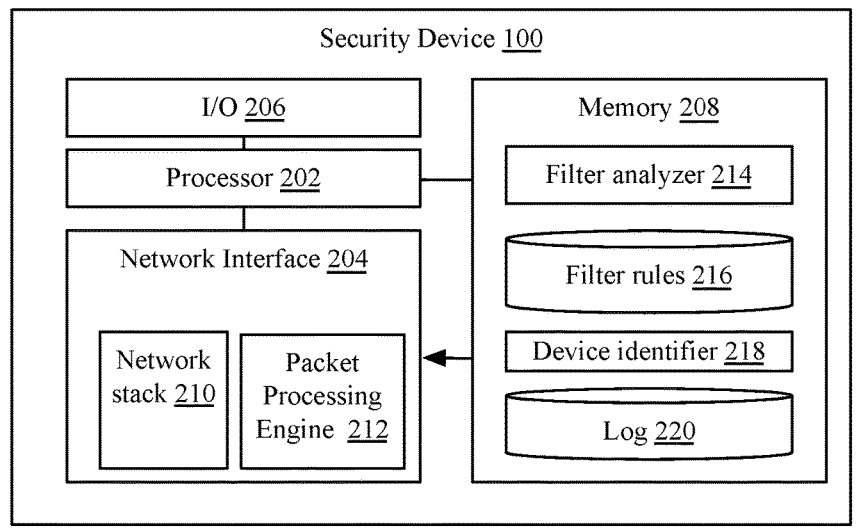
FIGS. 2A-2B are block diagrams of embodiments of a security device and management server, respectively.

FIG. 2A is a block diagram of an embodiment of a security appliance or security device 100. Security device 100 may comprise a laptop computer, desktop computer, wearable computer, portable computer, smart phone, tablet computer, network camera, or any other type and form of computing device capable of encoding and streaming media. In some implementations, a security device 100 may not include all of elements 202-220 illustrated, or may include a plurality of any of elements 202-220 or other elements. For example, in one implementation, a security device 100 may comprise a plurality of network interfaces 204. Furthermore, although illustrated as a single device, in many implementations as discussed above, a security device 100 may comprise a plurality of security device 100 in communication via a network, such as a separate switch and firewall, or any other combination of these or other devices. In some implementations, a security device 100 may comprise a virtual device or virtual machine, executed by a physical machine.

A security device 100 may include one or more processors 202. A processor 202 may comprise a central processing unit (CPU), microprocessor, application-specific instruction-set (ASIC) processor, or any other type and form of processor for receiving, analyzing, filtering, blocking, modifying, and/or retransmitting packets. A processor 202 may communicate with one or more network interfaces 204, which may comprise any type and form of network interfaces, such as a physical interface (e.g. Ethernet, fiber optic interface, or any other such interface), a wireless interface (e.g. 802.11a, 802.11b, 802.11.g, 802.11n, 802.11ac, Bluetooth, cellular, or any other such interface), or a virtual or abstract interface (e.g. physical transport of storage, or "SneakerNet"), or any other such type and form of interface. Network interfaces 204 may be used for receiving and transmitting packets, as well as performing many types of data extraction and processing on the packets. Network interfaces 204 may communicate with computing devices 102, 104 via a network (not illustrated), which may comprise any type and form of network or networks, including a LAN and/or WAN such as the Internet. For example, in many implementations, a security device 100 may connect to a first LAN, which may connect to the Internet, which may further connect to a second LAN connected to client devices. Accordingly, a network may comprise one or more of a physical network, an Ethernet network, a satellite network, a wireless network, a cellular network, or any other network or combination of networks, and may further comprise one or more devices including gateways, firewalls, network accelerators, proxies, switches, hubs, routers, WiFi access points, load balancers, or any other such devices.

A network interface may include a network stack 210, which may comprise processing and functionality for a plurality of layers of the stack, including a physical layer, network layer, transport layer, session layer, presentation layer, application layer, or any other such layers. The network stack 210 may comprise routines for encapsulating and de-encapsulating headers and payloads of packets at various layers, and may provide functionality for one or more protocols at any layer of the network stack.

A security device 100 may execute a packet processing engine 212, which may be part of the network interface 204 or network stack 210, or may be executed separately by a processor 202. A packet processing engine 212 may comprise an application, service, server, daemon, routine, or other executable logic for processing packets, including performing network address translation, encryption, decryption, compression, decompression, modification of headers or payloads, buffering, caching, pooling, multiplexing, fragmentation or defragmentation, error correction, retransmission handling such as for a lossless protocol, or any other type and form of processing. In some implementations, packet processing engine 212 may extract data or identifiers from a packet for analysis and filtering, such as extracting IP addresses or ports, protocol types, QoS parameters, payload sizes, sequence numbers, or any other type and form of information.

A security device 100 may comprise one or more input/output interfaces 206. An input or output interface 206 may comprise any type and form of interface and/or connected peripherals, such as a video interface and display; a parallel or serial interface, such as a universal serial bus (USB) interface and a mouse or keyboard, or an external serial AT attachment (eSATA) interface and one or more external storage devices; or any other type and form of interface.

A security device 100 may comprise one or more memory devices 208. Memory 208 may comprise any type and form of memory or storage, including random access memory (RAM), hard drive storage, solid state drive storage, flash memory, optical or magneto-optical storage, tape storage, or any other type and form of storage device.

Security device 100 may execute a filter analyzer 214, which may be stored in memory 208 and executed by a processor 202 and/or network interface 204. Filter analyzer 214 may comprise an application, service, server, daemon, routine, or other executable logic for performing queries of a rule set or database of filter rules 216 as discussed above, such as generating and executing SQL queries or queries in a similar database language. As discussed above, in some implementations, a relational database of filter rules 216 may comprise one or more actions, conditions, and parameters, such as source IP address ranges and corresponding blocking rules. Parameters may be any type and form of information extracted from packets as discussed above, and/or may include meta-information about a packet or connection, such as a connection latency, error rate, jitter, bandwidth, or other such information. For example, a filter rule may be configured to block packets to a specified destination IP address if a connection to the destination has a latency within a predetermined range. Processing rules define actions to be performed on matching packets, including blocking or discarding the packet, buffering or delaying the packet, forwarding the packet to a specified destination, transmitting the packet to its identified destination address, and/or modifying one or more headers or payloads of the packet.

Rules 216 may be periodically refreshed. For example, in many implementations, a security device 100 may maintain a timer. Upon expiration of the timer (e.g. once per day, once per week, once per two weeks, once per 12 hours, or any other time period), the security device 100 may transmit a request for a refreshed rule set 216 to a management server. The management server may respond with a replacement rule set including mandatory rules and randomly selected (according to distribution weights or scores) potential rules, as discussed above. In some implementations, to reduce bandwidth, the server may respond with an identification of rules to be removed or replaced from a current rule set. For example, the management server may identify a current rule set for the security device (e.g. via a device identifier of the device stored in association with rules in a database as discussed above, via a stored copy of the rule set, etc.), and may generate a new rule set for the device, including randomly selecting potential rules as discussed above. The management server may identify a delta or difference between the two rule sets, and may transmit an identification of the difference to the security device (e.g. "delete rule #105; add new rule #202: [actions, conditions, and parameters]; etc."). As mandatory rules may be only rarely removed or added, this may significantly reduce bandwidth requirements, and may help scaling rule distribution to large numbers of security devices.

In many implementations, a request for new rules or other communications with the management server may comprise a device identifier 218. Device identifier 218 may comprise an alphanumeric string, serial number, MAC address, username or account name, address, GUID, or any other type and form of identifier to distinguish the security device from other security devices. In many implementations, device identifier 218 may be set by a manufacturer, while in other implementations, device identifier 218 may be set by an administrator or user (e.g. user name).

In some implementations, a security device 100 may maintain a log 220. Log 220 may comprise a database, flat file, or other type and form of data structure for recording packet parameters and applied filter actions. In some implementations, security device 100 may record actions with timestamps, device identifiers, or other distinguishing information. Log 220 may be sent to a management server in some implementations to identify attacks or attack attempts, and adjust likelihoods or scores associated with rules.

Figure 2B:
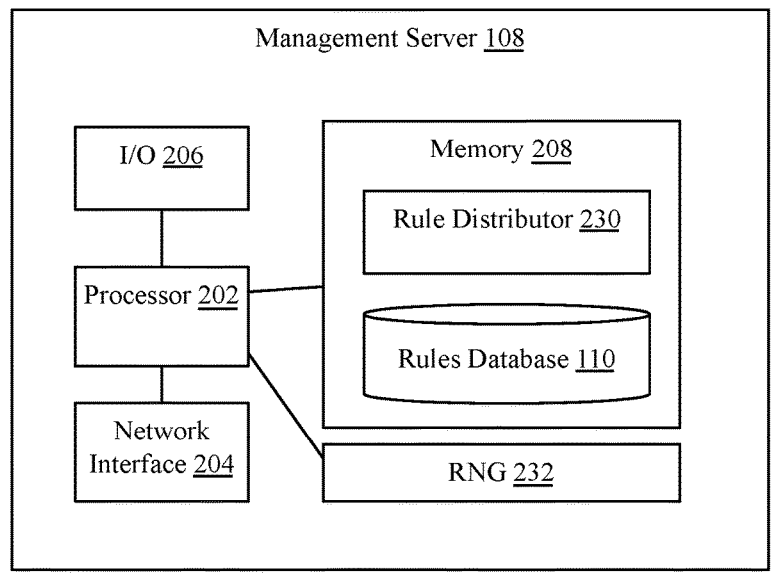

FIG. 2B is a block diagram of an implementation of a management server 108. A management server 108 may comprise a laptop computer, desktop computer, rackmount computer, blade computer, workstation, or any other type and form of computing device. In some implementations, management server 108 may comprise a physical machine, or a virtual machine executed by a physical machine. In many implementations, one or more components of a management server 108 may be distributed across a cloud or cluster of machines, such as a server cloud or server farm. Accordingly, management server 108 may comprise one or more physical machines, one or more virtual machines executed by one or more physical machines, or a combination of virtual and physical machines. As with security device 100, the management server 108 may comprise one or more processors 202, network interfaces 204, input/output interfaces 206, and memory devices 208.

In some implementations, a management server 108 may comprise or execute a rule distributor 230. Rule distributor 230 may comprise an application, server, service, routine, daemon, or other executable logic for generating and distributing rule sets for security devices. As discussed above, management server 108 may maintain a rule database 110, and rule distributor 230 may select mandatory and potential rules from rules database 110 to generate rule sets for security devices. Rule sets may be cached or stored in memory 208 in some implementations to allow easy rebuilding or retransmission or computation of deltas with new rule sets, as discussed above.

In many implementations, a management server 108 may comprise a random or pseudorandom number generator (RNG) 232 for randomly selecting from rules to be added to a rule set for a security device. RNG 232 may comprise hardware, software, or a combination of hardware and software. In many implementations, a truly random number generator 232 may be used to increase security for the system by preventing discovery of distribution patterns of rules. RNG 232 may comprise a physical noise source, such as an optical, acoustic, magnetic, mechanical, or temperature sensor, or any other type of random source. In other implementations, management server 108 may select rules based off a device identifier of a security device. For example, rather than using a random number generator 232, in one implementation, a rule distributor 230 may generate random numbers by calculating a hash result with inputs of one or more of a device identifier, a request timestamp, a synchronization value of a connection to the device, a round trip time of communications to the device, or any combination of these or other values. This may provide sufficient entropy without requiring additional hardware.

Figure 3:
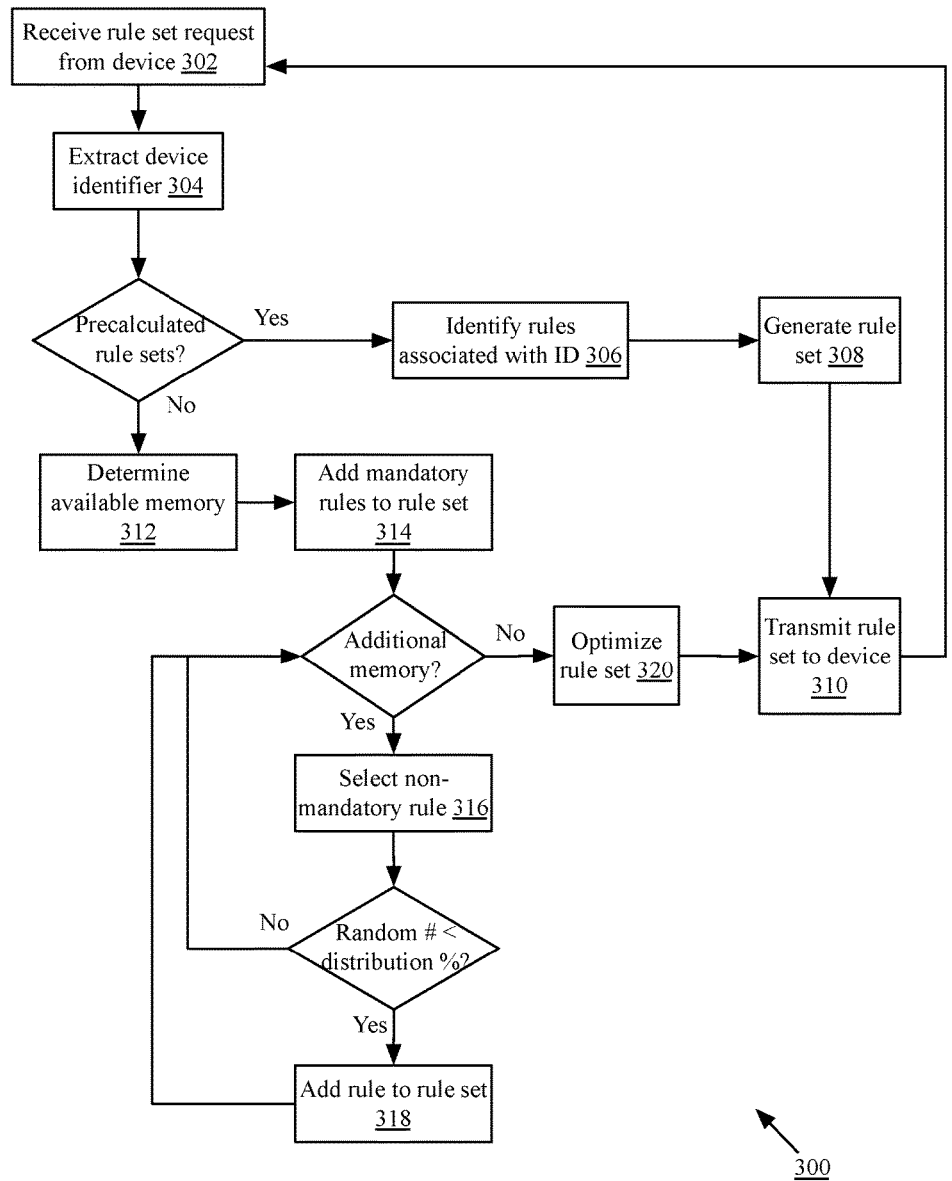
FIG. 3 is a flow chart of an embodiment of a method for providing distributed rule sets for network security appliances.

FIG. 3 is a flow chart of an embodiment of a method 300 for providing distributed rule sets for network security appliances or devices 100. Although shown in particular order, in some implementations, one or more steps may be done simultaneously or in reverse order, or some steps may be optional.

At step 302, in some implementations, a management server may receive a request from a security appliance for a rule set. The request may be transmitted responsive to initialization or start-up of the security appliance, responsive to expiration of a present rule set (e.g. on expiration of a timer), in response to an update code or trigger sent to the security appliance, in response to detection by the security appliance of an attack or attempted attack on network devices via packets traversing the security appliance, or any other such conditions. The request may be of any type and form, such as an HTTP request, FTP request, Representational State Transfer (RESTful) request such as an HTTP POST or GET request, or via any other protocol, application programming interface, or remote function call. Although shown as a single step, in many implementations, step 302 may comprise performing a session establishment or handshaking routine.

In many implementations, the request may comprise a device identifier of the security appliance. If so, at step 304, the management server may extract the device identifier from the request. The device identifier may be in a payload of the request, such as a session or application layer payload; or may be in a header of the request, such as in an options field of a transport layer header.

In some implementations, rule sets may be pre-calculated or generated by a rule distributor of the management server. For example, the management server may pre-generate a large number of rule sets to ensure a proper statistical distribution of rules to security appliances. Devices identifiers for each security appliance may be added to entries in the rule database corresponding to rules included in the rule set corresponding to the appliance (the rule set may then be discarded to save storage, in some implementations). If so, at step 306, the rule distributor may iteratively proceed through the rule database, identifying each rule associated with the device identifier of the security appliance. At step 308, the rules may be added to a rule set for the device. In many implementations, steps 306-308 may be performed iteratively for each rule associated with the appliances device identifier until the rule set is complete.

At step 310, the rule set may be transmitted to the security appliance. In some implementations, as discussed above, the management server may determine a delta or difference between the newly generated rule set and a previously transmitted rule set for the appliance. In such implementations, the management server may simply transmit an identification of the differences with instructions to the security appliance to modify the previously transmitted rule set to match the newly generated rule set.

In implementations in which the rule set is not pre-generated or calculated, at step 312, in some implementations, the management server may determine an available memory of the security appliance. In many implementations, different models or versions of the security appliance may have different rule set storage limits (which may be based not only on physical storage space, but also on processor speeds and time for a packet processing engine to analyze and apply all of the rules within a rule set to incoming packets without undue delay). In some implementations, the request received at step 302 may identify an available storage amount of the security appliance. In other implementations, the management server may utilize a lookup table to determine the amount of available storage, based on the device identifier of the security appliance and/or model or version information transmitted with the request at step 302.

At step 314, the management server may add all of the mandatory rules in the rule database to a rule set for the security appliance. In some implementations, adding all of the mandatory rules may comprise adding any rule with a mandatory flag set, while in other implementations, adding all of the mandatory rules may comprise adding any rule with a score or distribution percentage at the top of a corresponding range (e.g. a score of 10 or a percentage of 100%). In other implementations, mandatory rules may be treated the same as potential rules, but with scores or distribution percentages at the top of the corresponding range. In such implementations, step 314 may be performed during iterations of steps 316-318 as the rule distributor proceeds through the rule database.

If addition of the mandatory rules to a rule set for the appliance does not cause the rule set to exceed the available storage amount for the device, then additional rules may be selected for inclusion. A non-mandatory or potential rule may be selected at step 316. In some implementations, the rule may be selected randomly from the rule database, while in other implementations, each rule may be selected in order, advancing through the rule database.

The rule distributor may generate a random distribution score value. In some implementations, the random distribution score value may comprise an output of a random or pseudorandom number generator of the management server. In other implementations, the random distribution score value may be generated via a hash calculation on inputs of one or more of a device identifier, timestamp, metadata about the connection to the security appliance, etc. In some implementations, the rule distributor may generate a random distribution score value once and may utilize it for each iteration of steps 316-318 and comparison to a distribution score or percentage for a rule during generation of the rule set; in other implementations, the rule distributor may generate a new random distribution score value for each new rule and repetition of steps 316-318.

If the random score value is less than the distribution score or percentage (or, in other implementations in which score values are reversed with a lower score indicating greater inclusion, if the random score value is greater than the distribution score or percentage), then the rule may be added to the rule set for the appliance. The flow distributor may again determine if more storage space is available, and if so, may repeat steps 316-318 for each additional rule in the database. These steps may be repeated until no more memory storage space is available. In some implementations, the steps may be repeated iteratively for each next rule through the database linearly, while in other implementations, the steps may be repeated for randomly selected rules (or rules randomly selected from a subset of the rules not including mandatory flagged rules). This may help to avoid over-representation of rules earlier in the database.

At step 320, in some implementations, the management server may optimize the rule set to reduce memory requirements. For example, in one implementation, the management server may reduce a number of rules by identifying minimum bounding rectangles (MBR) that cover the same conditions and parameters as the rules. For example, given a plurality of rules having identical actions and parameters, but associated with similar, though different IP addresses, in some implementations, two or more rules may be combined, speeding up processing and further reducing the memory requirements of the database.

Accordingly, the systems and methods discussed herein provide for reducing rule set sizes via statistical redistribution throughout a plurality of network security appliances. A rule set may be generated for each security appliance that includes (i) a first set of rules based on known attacks, identified as rules for mandatory inclusion in the rule set; and (ii) a subset of a second set of rules, identified as rules for potential inclusion in the rule set, selected randomly according to a distribution percentage, score, or weight for each potentially included rule. Higher scored rules, which may be more likely vectors for potential attack, may be distributed to a greater number of appliances; while lower scored rules that may be less likely or represent more speculative attacks may be distributed to fewer appliances.

Accordingly, the rule set for any security appliance may be limited in size compared to the entire rules database, while still providing protection against most attacks. This may allow reduced memory utilization on each security appliance, and reduced bandwidth consumption during distribution of the rules from a management server. Furthermore, by limiting the size of an active rule set on an appliance, the appliance may have reduced CPU usage and delay processing packets against the rule set in comparison to a complete rule set including both mandatory and potential rules. This may also improve battery life on portable appliances. Additionally, appliances deployed with rules for potential inclusion may provide early warnings of new attacks, such that the corresponding rule may quickly be added to the first, mandatory inclusion set for each security appliances.

Additionally, as discussed above, to reduce latency, it is desirable to have rule sets in fast memory storage, such as RAM, rather than slower storage such as a hard drive or even a flash drive. However, the larger the rule set, the more memory required. First, this may increase the cost of the device. Second, in case of a malicious attack on the device itself in which an intruder is able to load executable data into memory for execution, if the memory of the device is limited in size, this reduces the potential complexity of any such executable data. It may also inhibit the ability of a malicious attacker to hide malware or viruses within memory of the security appliance.

In one aspect, the present application is directed to a method for providing distributed rule sets for network security appliances. The method includes generating, by a management server from a rule database comprising a plurality of packet processing rules, a first rule set for a first security appliance, the first rule set comprising a first subset of the packet processing rules and a second subset of the packet processing rules. The method also includes generating, by the management server, a second rule set for a second security appliance, the second rule set comprising the first subset of the packet processing rules and a third subset of the packet processing rules different from the second subset. The method further includes transmitting, by the management server, the first rule set to the first security appliance and the second rule set to the second security appliance.

In some implementations of the method, first subset consists of packet processing rules identified in the rule database as mandatory. In other implementations of the method, each packet processing rule is associated with a distribution percentage, and the first subset consists of one or more packet processing rules associated with a 100% distribution percentage. In a further implementation, the second subset and third subset each consist of one or more packet processing rules associated with distribution percentages less than 100%.

In some implementations of the method, generating the first rule set further comprises: adding the first subset of the packet processing rules to the first rule set, and adding the second subset of the packet processing rules to the first rule set. Adding the second subset may include adding a first additional packet processing rule of the packet processing rules to the first rule set; determining that a storage size of the first rule set is below a predetermined threshold; and adding a second additional packet processing rule of the packet processing rules to the first rule set. In a further implementation, adding the first additional packet processing rule to the first rule set includes: selecting the first additional packet processing rule; generating a random distribution score value; and adding the first additional packet processing rule to the first rule set responsive to the random distribution score value being less than a distribution percentage associated with the first additional packet processing rule. In a still further implementation, generating the random distribution score value further comprises retrieving the random distribution score value from a random number generator or pseudo random number generator of the management server. In another still further implementation, generating the random distribution score value further comprises calculating a result of a hash function with inputs comprising a device identifier of the first security appliance. In other further implementations, the method includes adding an association of a device identifier of the first security appliance, in the rule database, to each entry corresponding to each packet processing rule included in the first rule set. In still other further implementations, the method includes generating the first rule set by determining that the storage size of the first rule set exceeds the predetermined threshold; and transmitting the first rule set to the first security appliance is performed responsive to the determination.

In another aspect, the present disclosure is directed to a system for providing distributed rule sets for network security appliances. The system includes a management server comprising a processor executing a rule distributor, a network interface in communication with a first security appliance and a second security appliance, and a storage device comprising a rule database comprising a plurality of packet processing rules. The rule distributor is configured to generate a first rule set for a first security appliance, the first rule set comprising a first subset of the packet processing rules and a second subset of the packet processing rules. The rule distributor is also configured to generate a second rule set for a second security appliance, the second rule set comprising the first subset of the packet processing rules and a third subset of the packet processing rules different from the second subset. The network interface is configured to transmit the first rule set to the first security appliance and the second rule set to the second security appliance.

In some implementations of the system, the first subset consists of packet processing rules identified in the rule database as mandatory. In other implementations of the system, each packet processing rule is associated with a distribution percentage, and the first subset consists of one or more packet processing rules associated with a 100% distribution percentage. In a further implementation, the second subset and third subset each consist of one or more packet processing rules associated with distribution percentages less than 100%.

In some implementations, the rule distributor is further configured for generating the first rule set by: adding the first subset of the packet processing rules to the first rule set; and adding the second subset of the packet processing rules to the first rule set by: adding a first additional packet processing rule of the packet processing rules to the first rule set, determining that a storage size of the first rule set is below a predetermined threshold, and adding a second additional packet processing rule of the packet processing rules to the first rule set. In a further implementation, the rule distributor is further configured for: selecting the first additional packet processing rule, generating a random distribution score value, and adding the first additional packet processing rule to the first rule set responsive to the random distribution score value being less than a distribution percentage associated with the first additional packet processing rule. In a still further implementation, the management server further comprises a random number generator or pseudo random number generator; and the rule distributor is further configured for retrieving the random distribution score value from the random number generator or pseudo random number generator. In another still further implementation, the rule distributor is further configured for calculating a result of a hash function with inputs comprising a device identifier of the first security appliance. In some further implementations, the rule distributor is further configured for adding an association of a device identifier of the first security appliance, in the rule database, to each entry corresponding to each packet processing rule included in the first rule set. In another further implementation, the rule distributor is further configured for determining that the storage size of the first rule set exceeds the predetermined threshold; and transmitting the first rule set to the first security appliance is performed responsive to the determination.

Figure 4:
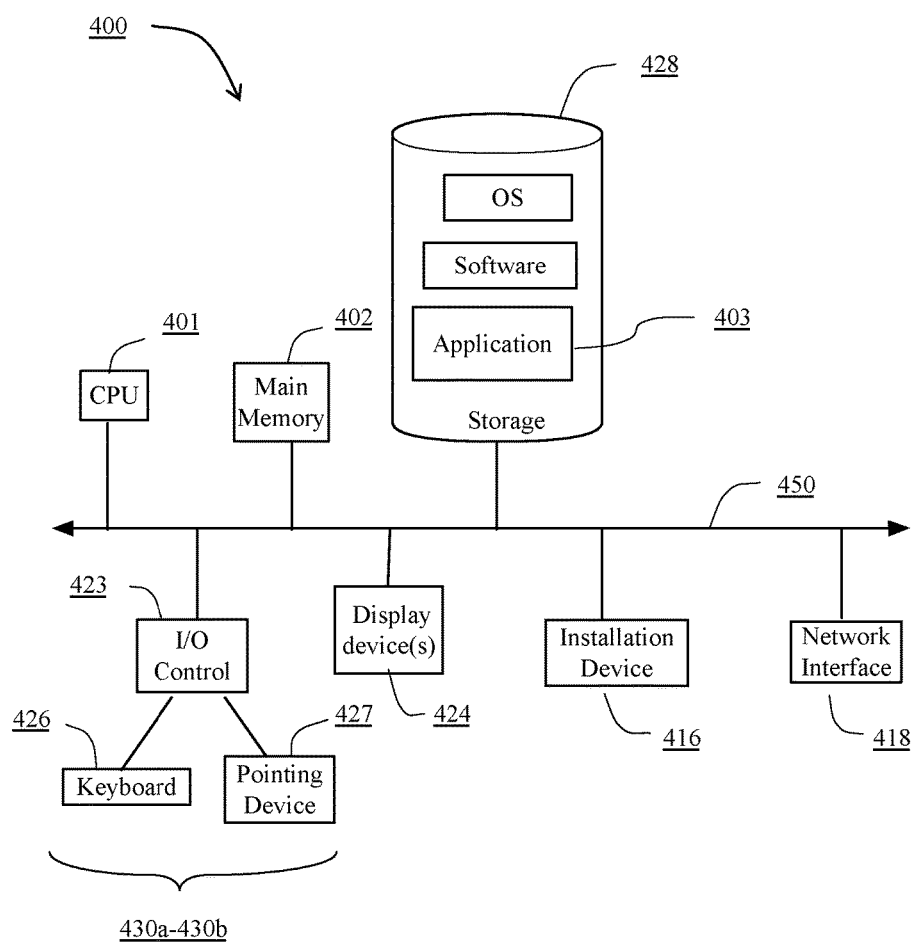
FIG. 4 is a block diagram of an exemplary computing device useful for practicing the methods and systems described herein.

FIG. 4 is a block diagram of an exemplary computing device useful for practicing the methods and systems described herein. The various devices 100, 102, 104, 108 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 4 depicts a block diagram of a computing device 400 useful for practicing an embodiment of the media sources, streaming servers, controllers, and/or client devices discussed above. A computing device 400 may include a central processing unit 401; a main memory unit 402; a visual display device 424; one or more input/output devices 430a-430b (generally referred to using reference numeral 430), such as a keyboard 426, which may be a virtual keyboard or a physical keyboard, and/or a pointing device 427, such as a mouse, touchpad, or capacitive or resistive single- or multi-touch input device; and a cache memory 440 in communication with the central processing unit 401.

The central processing unit 401 is any logic circuitry that responds to and processes instructions fetched from the main memory unit 402 and/or storage 428. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 402 may be one or more memory chips capable of storing data and allowing any storage location to be directly accessed by the microprocessor 401, such as random access memory (RAM) of any type. In some embodiments, main memory unit 402 may include cache memory or other types of memory.

The computing device 400 may support any suitable installation device 416, such as a floppy disk drive, a CD-ROM drive, a CD-R/RW drive, a DVD-ROM drive, tape drives of various formats, USB/Flash devices, a hard-drive or any other device suitable for installing software and programs such as any client agent, host agent, server, application 403, or portion thereof. The computing device 400 may further comprise a storage device 428, such as one or more hard disk drives or redundant arrays of independent disks, for storing an operating system and other related software, and for storing application software programs.

Furthermore, the computing device 400 may include a network interface 418 to interface to a Local Area Network (LAN), Wide Area Network (WAN) or the Internet through a variety of connections including, but not limited to, standard telephone lines, LAN or WAN links (e.g., Ethernet, T1, T3, 56kb, X.25), broadband connections (e.g., ISDN, Frame Relay, ATM), wireless connections, (802.11a/b/g/n/ac, BlueTooth), cellular connections, or some combination of any or all of the above. The network interface 418 may comprise a built-in network adapter, network interface card, PCMCIA network card, card bus network adapter, wireless network adapter, USB network adapter, cellular modem or any other device suitable for interfacing the computing device 400 to any type of network capable of communication and performing the operations described herein.

A wide variety of I/O devices 430a-430n may be present in the computing device 400. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 430 may be controlled by an I/O controller 423 as shown in FIG. 4. The I/O controller may control one or more I/O devices such as a keyboard 426 and a pointing device 427, e.g., a mouse, optical pen, or multi-touch screen. Furthermore, an I/O device may also provide storage 428 and/or an installation medium 416 for the computing device 400. The computing device 400 may provide USB connections to receive handheld USB storage devices such as the USB Flash Drive line of devices manufactured by Twintech Industry, Inc. of Los Alamitos, Calif.

The computing device 400 may comprise or be connected to multiple display devices 424a-424n, which each may be of the same or different type and/or form. As such, any of the I/O devices 430a-430n and/or the I/O controller 423 may comprise any type and/or form of suitable hardware, software embodied on a tangible medium, or combination of hardware and software to support, enable or provide for the connection and use of multiple display devices 424a-424n by the computing device 400. For example, the computing device 400 may include any type and/or form of video adapter, video card, driver, and/or library to interface, communicate, connect or otherwise use the display devices 424a-424n. A video adapter may comprise multiple connectors to interface to multiple display devices 424a-424n. The computing device 400 may include multiple video adapters, with each video adapter connected to one or more of the display devices 424a-424n. Any portion of the operating system of the computing device 400 may be configured for using multiple displays 424a-424n. Additionally, one or more of the display devices 424a-424n may be provided by one or more other computing devices, such as computing devices 400a and 400b connected to the computing device 400, for example, via a network. These embodiments may include any type of software embodied on a tangible medium designed and constructed to use another computer's display device as a second display device 424a for the computing device 400. One ordinarily skilled in the art will recognize and appreciate the various ways and embodiments that a computing device 400 may be configured to have multiple display devices 424a-424n.

A computing device 400 of the sort depicted in FIG. 4 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 400 may have different processors, operating systems, and input devices consistent with the device. For example, in one embodiment, the computer 400 is an Apple iPhone or Motorola Droid smart phone, or an Apple iPad or Samsung Galaxy Tab tablet computer, incorporating multi-input touch screens. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, JavaScript, or in any byte code language such as JAVA. The software programs may be stored on or in one or more articles of manufacture as object code.

What is claimed:

1. A method for providing distributed rule sets for network security appliances, comprising:
    generating, by a management server, from a rule database comprising a plurality of packet processing rules, a first rule set for a first security appliance by:
        adding, to the first rule set, a first subset of the packet processing rules consisting of packet processing rules identified in the rule database as mandatory,
        determining that a storage size of the first rule set is below a threshold, and
        adding, to the first rule set, a second subset of the packet processing rules consisting of packet processing rules not identified in the rule database as mandatory, responsive to the determination that the storage size of the first rule set is below the threshold;
    generating, by the management server, a second rule set for a second security appliance by:
        adding, to the second rule set, the first subset of the packet processing rules,
        determining that a storage size of the second rule set is below the threshold, and
        adding, to the second rule set, a third subset of the packet processing rules consisting of packet processing rules not identified in the rule database as mandatory, responsive to the determination that the storage size of the second rule set is below the threshold and responsive to addition of the second subset of the packet processing rules to the first rule set, the third subset different from the second subset; and
    transmitting, by the management server, the first rule set to the first security appliance and the second rule set to the second security appliance.

2. The method of claim 1, wherein each packet processing rule is associated with a distribution percentage, and wherein the first subset consists of one or more packet processing rules associated with a 100% distribution percentage.

3. The method of claim 2, wherein the second subset and third subset each consist of one or more packet processing rules associated with distribution percentages less than 100%.

4. The method of claim 1, wherein adding the first additional packet processing rule to the first rule set further comprises:
    selecting the first additional packet processing rule;
    generating a random distribution score value; and
    adding the first additional packet processing rule to the first rule set responsive to the random distribution score value being less than a distribution percentage associated with the first additional packet processing rule.

5. The method of claim 4, wherein generating the random distribution score value further comprises retrieving the random distribution score value from a random number generator or pseudo random number generator of the management server.

6. The method of claim 4, wherein generating the random distribution score value further comprises calculating a result of a hash function with inputs comprising a device identifier of the first security appliance.

7. The method of claim 1, further comprising adding an association of a device identifier of the first security appliance, in the rule database, to each entry corresponding to each packet processing rule included in the first rule set.

8. The method of claim 1, wherein generating the first rule set further comprises determining that the storage size of the first rule set exceeds the predetermined threshold; and wherein transmitting the first rule set to the first security appliance is performed responsive to the determination.

9. A system for providing distributed rule sets for network security appliances, comprising:
    a management server comprising a processor executing a rule distributor, a network interface in communication with a first security appliance and a second security appliance, and a storage device comprising a rule database comprising a plurality of packet processing rules comprising a first subset of packet processing rules identified as mandatory and a plurality of additional packet processing rules;
    wherein the rule distributor is configured to:
    generate a first rule set for a first security appliance by:
        adding, to the first rule set, a first subset of the packet processing rules consisting of packet processing rules identified in the rule database as mandatory,
        determining that a storage size of the first rule set is below a threshold, and
        adding, to the first rule set, a second subset of the packet processing rules consisting of packet processing rules not identified in the rule database as mandatory, responsive to the determination that the storage size of the first rule set is below the threshold, and
    generate a second rule set for a second security appliance by:
        adding, to the second rule set, the first subset of the packet processing rules,
        determining that a storage size of the second rule set is below the threshold, and
        adding, to the second rule set, a third subset of the packet processing rules consisting of packet processing rules not identified in the rule database as mandatory, responsive to the determination that the storage size of the second rule set is below the threshold and responsive to addition of the second subset of the packet processing rules to the first rule set, the third subset different from the second subset; and
    wherein the network interface is configured to transmit the first rule set to the first security appliance and the second rule set to the second security appliance.

10. The system of claim 9, wherein each packet processing rule is associated with a distribution percentage, and wherein the first subset consists of one or more packet processing rules associated with a 100% distribution percentage.

11. The system of claim 10, wherein the second subset and third subset each consist of one or more packet processing rules associated with distribution percentages less than 100%.

12. The system of claim 9, wherein the rule distributor is further configured for:
    selecting the first additional packet processing rule,
    generating a random distribution score value, and
    adding the first additional packet processing rule to the first rule set responsive to the random distribution score value being less than a distribution percentage associated with the first additional packet processing rule.

13. The system of claim 12, wherein the management server further comprises a random number generator or pseudo random number generator; and wherein the rule distributor is further configured for retrieving the random distribution score value from the random number generator or pseudo random number generator.

14. The system of claim 12, wherein the rule distributor is further configured for calculating a result of a hash function with inputs comprising a device identifier of the first security appliance.

15. The system of claim 9, wherein the rule distributor is further configured for adding an association of a device identifier of the first security appliance, in the rule database, to each entry corresponding to each packet processing rule included in the first rule set.

16. The system of claim 9, wherein the rule distributor is further configured for determining that the storage size of the first rule set exceeds the predetermined threshold; and wherein transmitting the first rule set to the first security appliance is performed responsive to the determination.

\* \* \* \* \*